May 29, 1956 E. H. BRUNKE 2,748,185
CONDENSER HOUSING AND MOUNTING THEREFOR
Filed Sept. 1, 1951 2 Sheets-Sheet 1
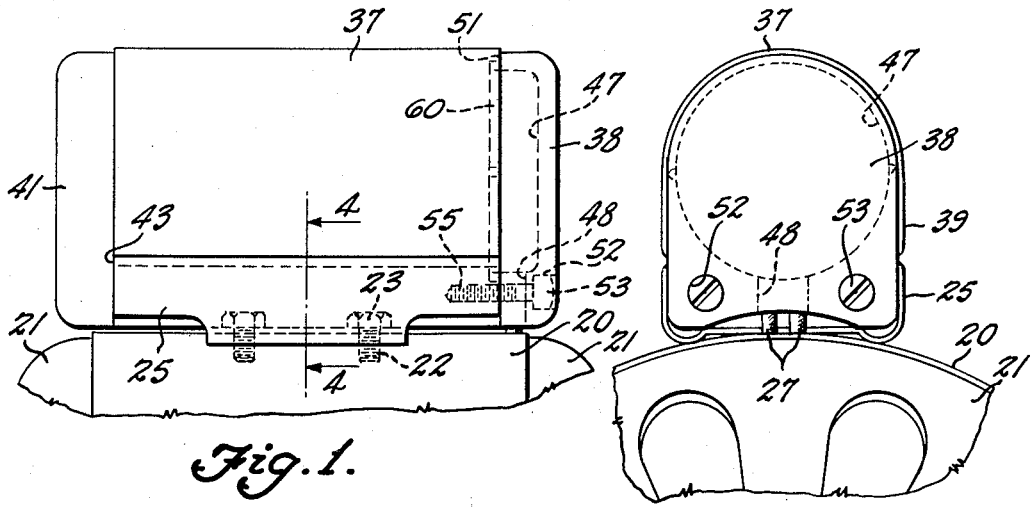
Fig. 1.
Fig. 2.
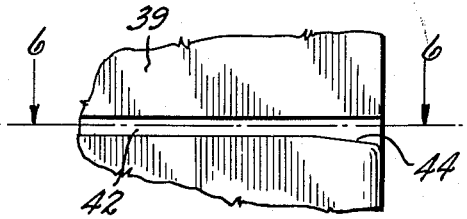
Fig. 5.
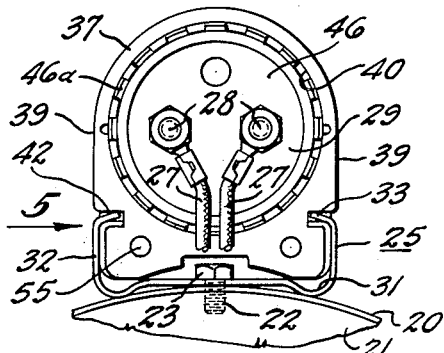
Fig. 3.
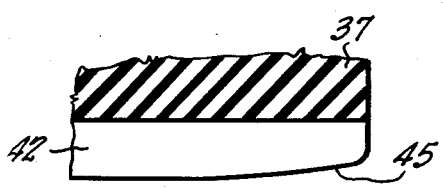
Fig. 6.
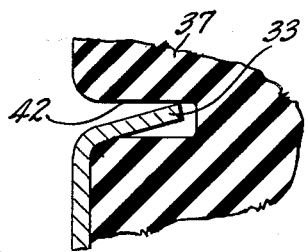
Fig. 4.
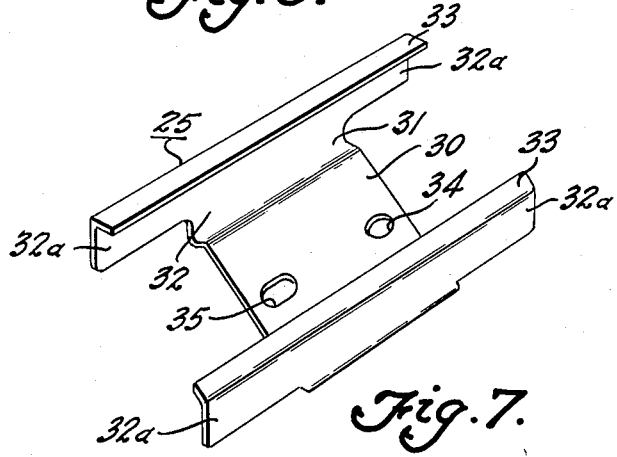
Fig. 7.
INVENTOR.
EARL H. BRUNKE
BY
Willits, Hardman & Fehr
his ATTORNEYS May 29, 1956
E. H. BRUNKE
2,748,185
CONDENSER HOUSING AND MOUNTING THEREFOR
Filed Sept. 1, 1951
2 Sheets-Sheet 2
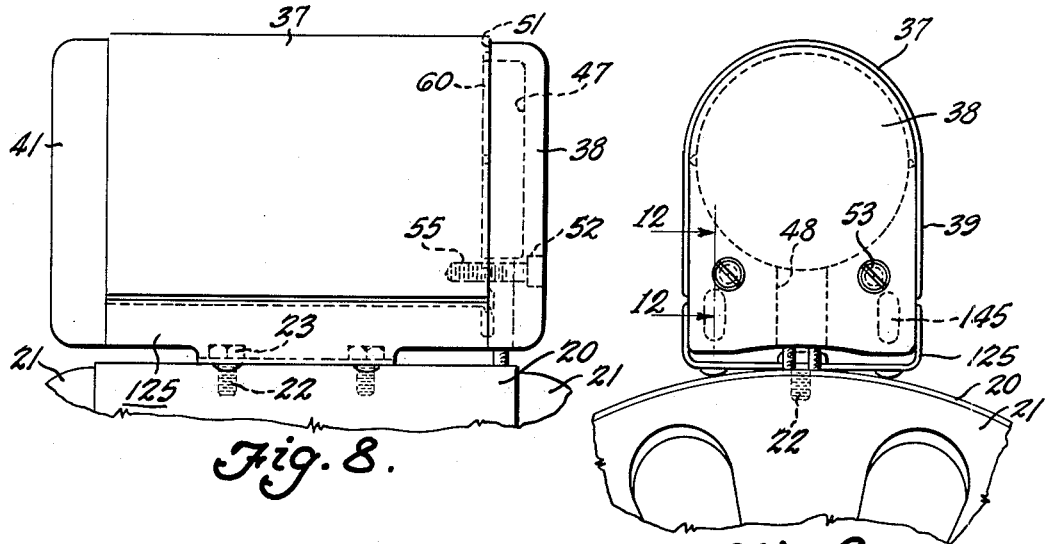
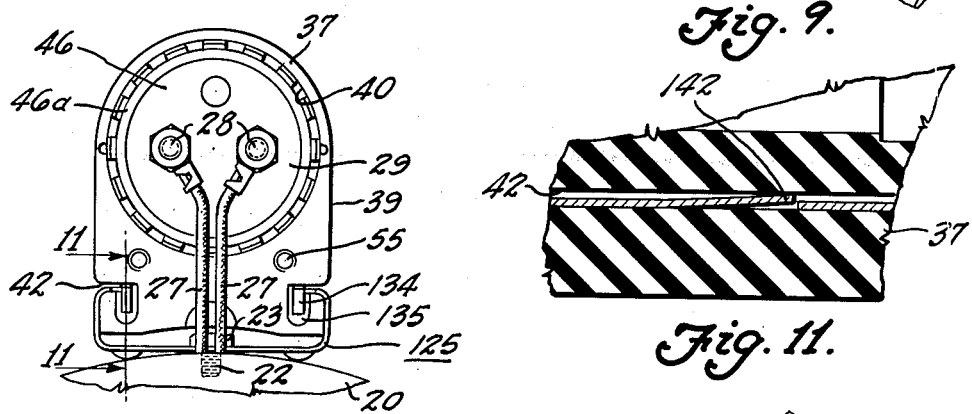
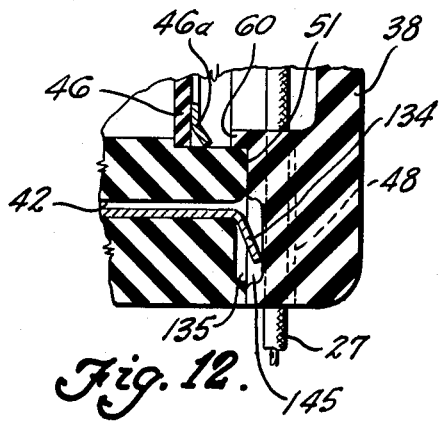
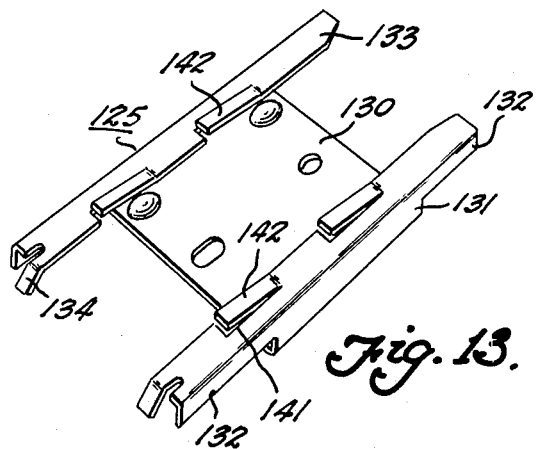
INVENTOR.
EARL H. BRUNKE
BY
Willits, Hardman & Fehr
his ATTORNEYS United States Patent Office 2,748,185
Patented May 29, 1956

2,748,185

CONDENSER HOUSING AND MOUNTING THEREFOR

Earl H. Brunke, Rochester, N. Y., assignor to General Motors Corporation, Detroit, Mich., a corporation of Delaware Application September 1, 1951, Serial No. 244,816

5 Claims. (Cl. 174—52)

The present invention relates to electric motor equipment and is particularly directed to means for supporting an electrolytic condenser on a frame of a single phase motor.

An object of the present invention is to provide an improved mounting bracket having resilient portions thereon so that an electrolytic condenser housing which is mounted on the bracket will not vibrate.

Another object is to provide a bracket to permit easy assembly and disassembly of the condenser housing and to provide closure means for the condenser housing that is effective when in position to prevent against axial movement of the condenser housing.

In carrying out the above objects it is a further object to provide a mounting bracket which is secured to the body with a pair of spaced grooves running longitudinally thereof and having at least one open end to receive two inwardly bent resilient ears carried by a mounting bracket adapted to be secured to a support. The grooves in the housing are formed to provide stops so that when the condenser body is inserted at one end the body is slid lengthwise until said one end of the ears engage the stops. In carrying out the above object the ears may take the form of converging ears or the ears may be located in the same plane and have resilient struck out portions. During this sliding movement the converging ears or the resilient struck out portions within the grooves engage one side of the grooves and when in assembled position the body is firmly maintained in position by the resiliency of the ears or struck out portion against rattling, and subsequently to such assembly a member is fixedly secured to the housing for locking the ears in the grooves of the housing with respect to the bracket.

Further objects and advantages of the present invention will be apparent from the following description, reference being had to the accompanying drawings wherein a preferred embodiment of the present invention is clearly shown.

In the drawings:

Fig. 1 is a fragmentary side view of a motor frame with a condenser mounting of the present invention mounted thereon.

Fig. 2 is an end elevational view of the assembly shown in Fig. 1.

Fig. 3 is a view similar to Fig. 2 with the cap or closure removed.

Fig. 4 is a sectional view, on an enlarged scale, taken on line 4—4 of Fig. 1.

Fig. 5 is a partial detail side view of the base of the condenser housing.

Fig. 6 is a sectional view taken on line 6—6 of Fig. 5.

Fig. 7 is a perspective detail of the mounting bracket.

Fig. 8 is a side view of another form of mounting of the present invention.

Fig. 9 is an end view looking in the direction of arrow in Fig. 8.

Fig. 10 is a view similar to Fig. 9 with the cap or closure for the condenser body removed.

Fig. 11 is a sectional view, on an enlarged scale, taken on line 11—11 of Fig. 10.

Fig. 12 is a sectional view, on an enlarged scale, taken on line 12—12 of Fig. 9.

Fig. 13 is a perspective detail of the modified form of the mounting bracket shown in Figs. 8, 9 and 10.

With particular reference to Figs. 1 and 3, 20 designates a motor frame of cylindrical formation and whose ends are fitted with end members 21, usually providing end bearings for the shaft of the rotor, not shown, of the motor.

The motor frame 20 is provided with threaded bolt or screw holes 22 for receiving bolts or screws 23 for securing a U-shaped bracket or fixture 25 to the motor frame 21. The frame is also provided with a suitable opening through which leads 27 are passed to connect the motor with terminals 28 of a condenser 29.

The bracket 25, see Fig. 7, is formed of sheet metal and deformed to provide a base 30 formed with longitudinal concave-convex grooves 31 on opposite sides thereof. A pair of upstanding elongated side members or elements 32 are integrally formed with the concave-convex portions 31. Each side member has projecting lugs or arms 32a that extend equal distances beyond the opposite ends of the side member 32. The arms 32a have their free ends bent toward each other to form lips or ears 33 in converging relation, but are spaced apart at the free longitudinal edges.

The base is provided with a circular opening 34 and an elongated opening 35. The screws or bolts 23 pass through the openings 34 and 35 from the outer face of the base and into threaded engagement with the opening 22 to secure the bracket in attached position on the frame 20. The elongated opening 35 permits a variation in the spacing of the bolt holes in the frame 20.

The bracket 25 supports a condenser body or housing 37 and a cap or closure 38 of the general configurations as shown in Figs. 2 and 3. The body and cap may be formed from molded Bakelite (phenol formaldehyde condensation products). It is to be understood that other materials may be used, for example, molded plastics, glass, or any other material having the same general characteristics of non-conductivity and strength. Further, shapes other than those disclosed in the drawings may be used if desired. In the present instance the body 37 is formed to provide a half rounded portion 38 and straight side walls 39. The body is formed with a cylindrical cavity 40 closed with an integral end 41. The side walls 39 are formed with grooves 42 in opposing relationship and these grooves terminate short of the end of the body to form stops 43 for the lips or ears 33. The lower wall of the grooves at the front end thereof is tapered to provide camming surfaces 44 and 45 to facilitate the insertion of the lips 33 therein.

An electrolytic or electrostatic condenser element is mounted within the cavity 40 of the housing. The elements of the condenser body is held within the cavity by a sealing disc 46 held within the cavity 40 by a retainer member 46a. The disc supports the terminals 28 which project outwardly beyond the open end of the cavity 40 and into a circular recess 47 of the cap 38 when the cap is assembled with the body. One of the connection leads 27 is secured to each of the terminals 28, and when the cap is assembled with the body the leads 27 will extend through a U-shaped notch 48 with the open end open at the open end of the cap.

The cap is formed with an annular skirt 60 to provide a shoulder 51. The skirt is formed with diametrical keys which fit in recesses formed in the inner wall of the cavity 40 to locate the cap in proper position in respect to the housing. The cap is provided with spaced openings 52, in this instance the openings are counterbored. Headed screws 53 pass through these openings from the outer face of the cap and into threaded engagement with opening 55 in the body to secure the cap to the body.

The assembly of the condenser body with the condenser elements therein to the bracket is as follows. The housing is first placed to the left of the bracket 25 and then the grooves 42 of the housing receive the ears 33. The housing is then slid on the ears 33 until the inner ends of the ears engage the stops 43. Then one end of the leads 27 are attached to their respective terminal 28. Then the cap is secured to the body by the headed screws 53. When the screws are threaded home the inner surface of the cap will engage the outer ends of the ears 33 to prevent axial movement of the condenser body and cap relative to the bracket in either direction.

Modifications of the structures shown in Figs. 1 to 7 inclusive which are effective in the same manner are shown in Figs. 8 to 13 inclusive. Fig. 13 illustrates in detail the features of a bracket or clip 125 formed of comparatively heavy gauge spring metal. The bracket includes a base or web 130. Projecting from opposite sides of the base are upstanding side flanges or wings 131. Each side member 131 has projecting lugs or arms 132 that extend equal distances beyond opposite ends of the flanges 131. The arms are bent inwardly to provide ears 133. Each ear or lip is provided with a tang 134 at one end to form stops and limit the sliding movement of a condenser body on the lips. The condenser body designed for mounting on the clip is similar in construction as that disclosed for the condenser body with this exception, the foreward or open end of the body is formed with suitable depressions or recesses 135 to receive the tangs 134.

In order to prevent rattling or loose movement of the housing on the clip or bracket the ears or lips 133 are slit as shown at 141 and the portions or tangs 142 formed by the slits 141 are bent upwardly, as viewed in Figs. 11 and 13 out of the normal plane of lips 133 and these lips are adapted to bear resiliently against the upper wall of the grooves or guideways 42 so as to retain the housing firmly in position on bracket before the cap is attached to the body.

In Figs. 8, 9 and 12 of the drawings a slight modification of the cap or closure is shown wherein the cap is provided with suitable depressions or recesses 145 opposite the grooves 42. In this construction the recess receives the tangs 134. Aside from the foregoing, the manner of attachment and coupling of the cap with the housing is identical with the structure shown in Figs. 1 and 2. In this instance as the closure is secured to the body the tangs 134 will yield, and no shifting of the parts will be experienced after the cap is secured.

While the embodiment of the present invention as herein disclosed, constitutes a preferred form, it is to be understood that other forms might be adopted.

What is claimed is as follows:

1. The combination with a condenser having a housing of insulating material with an open end, opposite exterior sidewalls of said housing having longitudinal grooves therein, and a cap of insulating material constructed and arranged to be attached to said housing so as to close said open end; of a mounting bracket having opposed, inwardly extending portions arranged to be received in said longitudinal grooves and retained therein by said cap so as to preclude relative movement between the bracket and the condenser housing.

2. The combination with a condenser having a housing of insulating material with an open end, opposite exterior sidewalls of said housing having longitudinal grooves therein which terminate short of the closed end of the housing, and a cap of insulating material constructed and arranged to be attached to said housing so as to close the open ends of said housing and grooves; of a mounting bracket having opposed, inwardly extending portions arranged to be received in said longitudinal grooves and retained therein by said cap so as to preclude relative movement between said condenser housing and said bracket.

3. The combination with a condenser having a housing of insulating material with an open end, opposite exterior sidewalls of said housing having longitudinal grooves therein which terminate short of the closed end of the housing, and a cap of insulating material constructed and arranged to be attached to said housing so as to close the open ends of said housing and grooves; of a mounting bracket having opposed, inwardly extending portions arranged to be received in said longitudinal grooves and retained therein by said cap, said opposed inwardly extending portions having an angular relationship with the grooves so as to frictionally engage the groove walls whereby relative movement between the condenser housing and bracket is precluded.

4. The combination with a condenser having a housing of insulating material with an open end, opposite exterior sidewalls of said housing having longitudinal grooves therein which terminate short of the closed end of the housing, and a cap of insulating material constructed and arranged to be attached to said housing so as to close the open ends of said housing and grooves; of a mounting bracket having opposed, inwardly extending portions arranged to be received in said longitudinal grooves and retained therein by said cap, each of said opposed inwardly extending portions having at least one deformed tang arranged to frictionally engage the groove walls so as to preclude relative movement between the condenser housing and the bracket.

5. The combination with a condenser having a housing of insulating material with an open end, opposite exterior sidewalls of said housing having longitudinal grooves therein which terminate short of the closed end of the housing, the open ends of said grooves having connection with recesses in the open end wall of said housing, and a cap of insulating material constructed and arranged to be attached to said housing so as to close the open ends of said housing and grooves, said cap having recesses which are aligned with the recesses in the open end wall of said housing; of a mounting bracket having opposed, inwardly extending portions arranged to be received in said longitudinal grooves and retained therein by said cap, one end of each opposed inwardly extending portion having a deformed tang arranged to be received in the aligned recesses of the cap and housing whereby relative movement between the condenser housing and the bracket is precluded.

References Cited in the file of this patent

UNITED STATES PATENTS

| 1,039,548 | Kral | Sept. 24, 1912 |
| 1,286,772 | Read | Dec. 3, 1918 |
| 1,289,861 | Mills | Dec. 31, 1918 |
| 1,837,820 | Hollman et al. | Dec. 22, 1931 |
| 1,902,748 | Ziehl | Mar. 21, 1933 |
| 2,161,955 | Dunham | June 13, 1939 |
| 2,219,495 | Sleeter et al. | Oct. 29, 1940 |
| 2,239,618 | Muirhead | Apr. 22, 1941 |
| 2,460,903 | Peck | Feb. 8, 1949 |

FOREIGN PATENTS

| 529,804 | Great Britain | Nov. 28, 1940 |